Figures 1, 2:
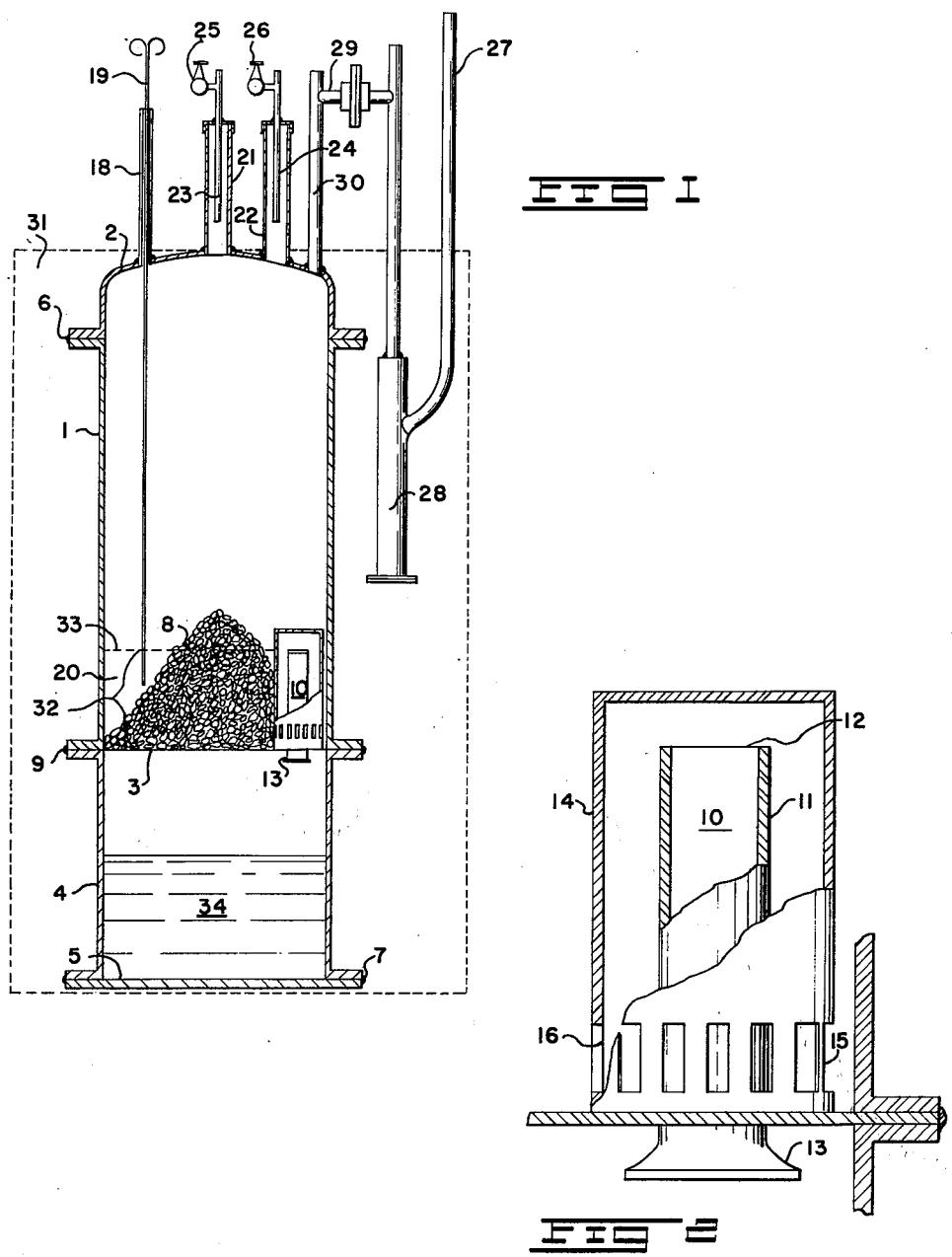

Dec. 3, 1963  V. E. HOMME  3,113,017
METHOD FOR REACTING TITANIC CHLORIDE WITH AN ALKALI METAL
Filed July 6, 1960

INVENTOR
VERNON E. HOMME

BY Ernest S. Cohen
Gersten Sadowsky
ATTORNEY

United States Patent Office 3,113,017
Patented Dec. 3, 1963

3,113,017
METHOD FOR REACTING TITANIC CHLORIDE WITH AN ALKALI METAL
Vernon E. Homme, Boulder City, Nev., assignor to the United States of America as represented by the Secretary of the Interior
Filed July 6, 1960, Ser. No. 41,212
3 Claims. (Cl. 75—84.5)
(Granted under Title 35, U.S. Code (1952), sec. 266)

The invention herein described and claimed may be manufactured and used by or for the Government of the United States of America for governmental purposes without the payment of royalties thereon or therefor.

This invention relates to an improved method and apparatus for reacting titanic chloride with molten sodium metal to produce a melt product of a titanium lower chloride and sodium chloride. This melt is primarily usable in a two-step reduction for producing high-purity titanium metal, such as described in the co-pending application Serial No. 698,883, filed November 25, 1957, of Don H. Baker, Jr., and Vernon E. Homme, now Patent No. 3,069,255, granted December 18, 1962, and in preparing fused salt-baths for use in titanium electro-refining. The product of relatively low titanium trichloride content produced by means of this invention, is particularly suitable for further reduction to produce high-purity titanium. A melt product of low titanium trichloride content crystallizes in the desirable long fibrous needles having an emerald-green color. On the other hand, a high titanium trichloride content melt product is hard and brittle having the appearance of anthracite coal, and shows no apparent crystalline structure.

Side reactions that occur during the reaction of titanic chloride and molten sodium cause the formation of titanium trichloride which also dissolves in or produces complexes with sodium chloride. In various methods tried for reacting sodium with titanic chloride the sodium was fed in a fine stream or mist to provide greater reacting surface. As a result, the reaction of sodium with titanic chloride was so great at the temperature needed for reduction that the effects of side reactions proved the methods to be impractical. Moreover, these reduction methods required long periods of soaking of the melt (in contact with titanium metal), at a temperature above its melting point to decrease the titanium trichloride, and to dissolve titanium caused by the undesired side reactions. This operation was time consuming, involved the additional loss of heat, and was detrimental to a continuous reduction method. The method and apparatus of the present invention utilizes the side reactions to produce a satisfactory halide of titanium melt product, and at the same time eliminates a relatively long time soaking step.

Another object of the invention is to produce a desirable first stage product for a two-stage titanium refining process, by a method making use of normally undesirable side reactions in the first stage of the process.

A further object of the invention is to provide a novel apparatus in which the method of the invention may be practiced.

The over-all reaction to produce the desired melt product is defined by $2Na + TiCl_4 \rightarrow TiCl_2 + 2NaCl$. However, other reactions, hereinafter referred to as the side reactions, occur as intermediate steps in the process of transforming the sodium and titanic chloride to titanium dichloride and salt and are as follows:

$$Na + TiCl_4 \rightarrow TiCl_3 + NaCl$$
$$Na + TiCl_3 \rightarrow TiCl_2 + NaCl$$
$$2Na + TiCl_2 \rightarrow Ti + 2NaCl$$

and $$4Na + TiCl_4 \rightarrow Ti + 4NaCl$$
$$Ti + 2TiCl_3 \rightarrow 3TiCl_2$$

In order to utilize the side reactions in the most effective manner, an over-all balanced condition in the reactions must be achieved wherein the titanium metal formed by the over-all side reaction $TiCl_4 + 4Na \rightarrow Ti + 4NaCl$, and $TiCl_2 + 2Na \rightarrow Ti + 2NaCl$, is equal to that consumed by the side reaction $Ti + 2TiCl_3 \rightarrow 3TiCl_2$.

The novel apparatus of the invention is formed to advantageously utilize the teaching of the unique method of the invention based upon the relationships of the aforementioned reactions.

A preferred embodiment of an apparatus wherein the method may be practiced is illustrated by the figures of the drawing, of which—

FIG. 1 shows a cross-section view of the reactor assembly, and the inlet pipes and related apparatus connected to the assembly; and FIG. 2 shows a view partly in cross-section, of the overflow weir arrangement.

The heart of the structural arrangement as shown in FIG. 1, is a cylindrical tank-shaped reaction chamber 1, topped by a dome 2, and closed off at its bottom by a disc-like diaphragm 3. Under the reaction chamber is positioned a matching cylindrical product chamber 4, closed off at its bottom by a foundation plate 5, and covered at its top by the diaphragm 3. Dome 2, and plate 5 are joined to chambers 1 and 4 respectively, by means of collar flanges welded along the peripheries indicated by 6 and 7. The chambers 1 and 4, are joined to the diaphragm, and to each other by means of collar flanges welded at peripheral jointure 9 to form a unitary shell. Mild steel or stainless steel pipes may be used in forming chambers 1 and 4 and dome 2, and the diaphragm may be made of thin stainless steel sheet such as of 14-gauge metal.

With reference to FIGS. 1 and 2, there is shown extending through and welded into an aperture in the diaphragm 3, an overflow-weir pipe 10. The extended weir portion 11, opening into the reactor chamber 1, includes a reamed pipe opening at its top to form a sharp overflow lip 12, and an extended similarly formed weir portion 13, opening into the product chamber 4. Over weir portions 11, 12, is inverted a shield cap or can 14 of stainless steel or like material, having slotted holes such as 15, 16, around a periphery close to the lower edge of the can. Shield 14 is fixedly mounted on diaphragm 3, as shown in the figures.

In the dome 2, are provided a plurality of openings into which inlet pipes or conduits 18, 21, 22, and 30 are welded. Pipe 18 provides a support and seal for a thermocouple 19, which may be of the Chromel-Alumel type. The thermocouple extends into chamber 1 so as to be within, or close to the surface of the titanium chloride melt 20. A starting charge 8, of titanium metal is added to diaphragm 3 through conduit 21. Supported and sealed into conduits 21 and 22, are inlet pipes 23 and 24 respectively, feeding molten alkali-metal from orifice needle-valves 25, 26, which may have solenoid control, to the charge in reaction chamber 1. Solenoid valves may be automatically operated by a preset timing mechanism (not shown), to control the feed-rate.

The titanic chloride for the reaction in chamber 1, is fed from storage tanks and a flowmeter (not shown), through pipe 27, and into a stainless steel boiler 28. Connector pipe 29, and standpipe 30, provide a passage for the flow of the chloride from the boiler to the reaction chamber.

A furnace 31, an outline of which is indicated by dash lines, receives the assembled apparatus including the boiler 28. The walls of the furnace which are of thick insulating brick, provide an enclosure around the apparatus. However, a front section is fabricated in such manner that it could be removed as a unit to facilitate installation and removal of the reactor assemblies. When heating a reactor assembly, the furnace enclosure is completed by a lid molded in two sections from a lightweight castable refractory material. Automatic temperature control is employed to regulate the electric resistance heating or gas firing of the furnace.

Operation of an apparatus made in the form of the preferred embodiment wherein the melt-depth 32 (measured from diaphragm 3 to the melt surface 33) is three inches, provides a product of the desired qualities. For this apparatus a nineteen inch diameter reactor was used, and the upper weir extension 11 was made approximately three inches to maintain the selected depth of the melt.

As previously indicated, before inlet pipe 23 is sealed in conduit 21, titanium metal from an extraneous source is initially placed on the diaphragm 3. In this instance a charge of about 15 pounds of small pieces of titanium was deposited in the form of a cone which extended a few inches above the maximum level of the melt. To initiate the process, molten sodium at a temperature of 120° to 140° C., from a weighing chamber (not shown), is supplied to the reaction chamber inlet pipes 23 and 24, through the valves 25 and 26, respectively, and liquid titanic chloride, $TiCl_4$, is fed from a storage tank (not shown), through a flowmeter (not shown), pipe 27, and to boiler 28 which supplies $TiCl_4$ vapor to pipes 29, 30, for delivery to the reaction chamber 1.

The furnace temperature is set to be held at 650° C. The operating pressure in the reactor is maintained as near 0.0 p.s.i.g. as possible throughout the reduction. Suitable pressure conditions may range from zero to one p.s.i.g. during 65 to 70 percent of the reduction; and during the latter part of the reduction the pressure may increase to 1½ p.s.i.g. Sodium is fed to the reaction chamber 1, at the rate of 8 to 8.72 pounds per hour, and the titanic chloride is fed at the rate of 33 to 36 pounds per hour. Although the boiler is inside the furnace with the reactor, the cold $TiCl_4$ entering the boiler maintains a $TiCl_4$ vapor temperature of 370° to 400° C., throughout most of the run. The maintenance of proper titanic chloride and sodium feed rates for each size of reactor operates to keep the temperature of the melt below a critical value, where the side reactions for producing titanium metal proceeds too rapidly.

Within the over-all reaction $$2Na + TiCl_4 \rightarrow TiCl_2 + 2NaCl$$

titanium metal is formed as a result of the chloride $TiCl_2$, and tetrachloride $TiCl_4$, reacting with the sodium present; $2Na + TiCl_2 \rightarrow Ti + 2NaCl$, and $$4Na + TiCl_4 \rightarrow Ti + 4NaCl$$

It is at this stage that melt temperatures must be held below the critical value (in the range of 800° to 850° C.), in order to avoid a too rapid procedure of these reactions. At the high temperatures, the tetrachloride reduction to form titanium metal may also occur as a vapor reaction above the melt.

A concurrent side reaction occurs as a result of the titanic chloride contacting the titanium metal (initially placed on the diaphragm as well as that formed thereon by the reactions), which protrudes above the level of the melt, to form titanium chloride; $Ti + TiCl_4 \rightarrow 2TiCl_2$. However, the chloride $TiCl_2$ produced is partially oxidized to a trichloride $TiCl_3$, and a mixture thereof continually dissolving in the melt product from the sodium reduction, is washed into the melt. This oxidation $$TiCl_2 + TiCl_4 \rightarrow 2TiCl_3$$

also occurs with the $TiCl_2$ at the surface of the melt whenever the sodium pool becomes depleted.

Consequently the main reaction for reducing the trichloride $TiCl_3$ in the melt to titanous chloride $TiCl_2$, is effectively the soaking reaction $2TiCl_3 + Ti \rightarrow 3TiCl_2$, wherein the melt in contact with titanium metal, is held for a requisite period of time at a temperature above the melting point, preferably about 700° C. The optimum over-all effect is achieved when in an over-all balanced condition the titanium metal produced on the diaphragm 3, is used in the concurrent soaking reaction as fast as the metal is formed.

In the apparatus, the $TiCl_2$ product formed in the rising melt drains through the holes such as 15, 16, near the lower edge of the shield can 14, and flows up around the weir extension 11, to the level determined by height of the extension. The chloride then passes over the weir lip 12, into and through the weir pipe 10, to be received as the melt product 34 in the product chamber 4. In order to isolate the lower chamber 4, from the input tetrachloride vapor (and to thereby prevent in this chamber the reaction $TiCl_2 + TiCl_4 \rightarrow 2TiCl_3$), the shield can is provided with the inlet holes near the lower edge. It can be seen that when the melt depth reaches the overflow lip 12, these holes are submerged in the melt sealing the product chamber 4 from the $TiCl_4$ vapor above the melt in the reaction chamber 1.

In a run of the apparatus having the 19 inch diameter and the three inch melt level, 202 pounds of titanic chloride were reduced with 49 pounds of sodium to produce a melt having the following chemical analysis in percent:

| Fe | Na | Cl | Soluble Ti | Total Ti |
|---|---|---|---|---|
| <0.01 | 17.60 | 61.93 | 19.35 | 19.45 |

The average effective valence (AEV), of the product was 2.33. The total titanium produced and the AEV achieved are desirably close to the theoretical values of 20.3, and 2 respectively.

In a second construction in accordance with the preferred embodiment provision was made for a melt-depth 32, of eight inches. The reactor of this construction was sixteen inches in diameter. An initial charge of about 30 pounds of titanium metal was spread out on diaphragm 3, to effect a bed of uniform depth.

During the first 25 percent of the reduction in the second apparatus, the feed rate for the titanic chloride was 15.5 to 20 pounds per hour, and the feed rate for the sodium was 3.75 to 4.84 pounds per hour. For the balance of the reaction the titanic chloride was fed at 28 pounds per hour, and the sodium was fed at 6.78 pounds per hour. In this run 194 pounds of $TiCl_4$ were reduced with 47 pounds of sodium to produce melt products having the following chemical analyses in percent:

| Product | Na | Cl | Soluble Ti | Total Ti |
|---|---|---|---|---|
| Overflow melt | 17.67 | 60.92 | 21.36 | 21.45 |
| Diaphragm melt | 18.91 | 61.22 | 18.18 | 18.22 |

An average effective valence of 2.16 was obtained for the overflow product. The total-titanium analysis of the overflow melt was about one percent greater than the theoretical for the desired reaction indicating the additional utilization of titanium metal by the reaction $Ti + 2TiCl_3 \rightarrow 3TiCl_2$. Proof of the use of the titanium metal from the initial charge was seen in a decrease of titanium metal on the diaphragm from 30 to 27.6 pounds.

The more desirable melt product (AEV of 2.16, and a total titanium of 21.45 percent) of the second apparatus is attributable to an improved control of the reaction pressures in the apparatus. It was found that too rapid reactions increased the pressure in the reaction chamber 1 to the extent that the melt was forced over the weir lip 12, and into the product chamber 4, before the reduction of $TiCl_3$ to $TiCl_2$ was properly completed. Consequently the product melt was relatively high in $TiCl_3$, which resulted in a higher average effective valence.

Extensive protrusion of the titanium metal above the melt permits initial rapid chloride forming reactions due to the contact between the titanic chloride $TiCl_4$ and the large exposure of titanium metal ($Ti+TiCl_4 \rightarrow 2TiCl_2$), and the mixture of the $TiCl_2$ formed with the $TiCl_4$ present ($TiCl_2+TiCl_4 \rightarrow 2TiCl_3$). Resulting excessive pressure is generated in the reaction chamber 1, by sublimation and possible disproportionation (when the reaction zone temperature exceeds 877° C.) of the $TiCl_3$.

It can be seen that a condition of large exposed surfaces of titanium metal always exists when starting the reduction. It was to minimize the pressure increasing effects previously noted that the initial charge of titanium metal in the second apparatus was made in the form of a flat bed instead of a cone. By means of this expediency the charge of titanium metal is covered sooner by the rising melt resulting in less metal surface exposure to the titanic chloride vapors.

It was also found that as the reaction proceeded there was a tendency for stalagmites of titanium metal to be built up towards the top of the reactor under the sodium feed openings. Such formation if permitted to grow large, provide additional exposed surfaces of titanium metal to be effective for increasing reaction chamber pressures. By increasing the number of sodium feed inlet structures such as elements 21, 23, 25, and 22, 24, 26, and intermittently supplying the sodium feed to each structure in turn to effect even distribution of the sodium in the reaction chamber, the stalagmite formations of titanium metal will remain small and less effective for increasing reaction chamber pressures.

Equalization of the pressures in the chambers 1 and 4, provides an additional means for preventing pressure surges which cause the flow of the trichloride $TiCl_3$ into the product chamber. Regulated pressures in the chambers may be maintained by suppling helium under pressure to each of the chambers.

Reduction procedures in accordance with the method of the invention provides a melt product particularly suitable for use in the second stage of a two-stage reduction of titanic chloride to produce high grade titanium metal or in making fused salts baths for electro-refining cells. The melt product has an average effective valence close to that theoretically determined. By the method of the invention, operational time is saved by utilizing the soaking reaction $Ti+2TiCl_3 \rightarrow 3TiCl_2$, during the reduction.

Apparatus having the shielded, overflow weir diaphragm construction of the invention provides an effective means to effectuate the procedures in accordance with the method of the invention.

I claim:
1. A method for preparing titanium dichloride which comprises continuously introducing molten sodium metal and vaporous titanium tetrachloride into a reaction zone maintained at an elevated temperature whereby the sodium and titanium tetrachloride react to form in a body of melt titanium metal and sodium chloride, said melt also containing titanium chlorides including titanium dichloride and titanium trichloride, maintaining a quantity of titanium metal in the body of the melt in addition to that formed whereby the titanium metal reacts with titanium trichloride present to form titanium dichloride, withdrawing a quantity of melt from the body of melt in contact with said quantity of titanium metal being maintained therein, and wherein the rates of introduction of molten sodium and vaporous titanium tetrachloride are regulated to achieve an over-all balanced condition whereby the titanium metal formed in the reaction is equal to that consumed in the reduction of the trichloride to the dichloride of titanium.

2. The method as in claim 1, wherein the quantities of molten sodium and vaporous titanium tetrachloride introduced in accordance with predetermined rates, are related stoichiometrically to meet the requirements of the reaction $2Na+TiCl_4 \rightarrow TiCl_2+2NaCl$.

3. A method for preparing titanium dichloride which comprises introducing molten sodium metal and vaporous titanium tetrachloride into a reaction zone maintained at an elevated temperature, the reactions effected producing titanium metal, and chlorides of titanium including titanium trichloride, effecting concurrently further reaction between the titanium metal and titanium trichloride producing titanium dichloride, wherein the rates of introduction of molten sodium and vaporous titanium tetrachloride are maintained to accomplish an over-all balanced condition whereby the titanium metal produced in the reaction is equal to that consumed in the reduction of the titanium trichloride to titanium dichloride.

References Cited in the file of this patent

UNITED STATES PATENTS

| | | |
|---|---|---|
| 2,814,561 | Erasmus | Nov. 26, 1957 |
| 2,846,304 | Keller et al. | Aug. 5, 1958 |
| 2,847,298 | Vaughan | Aug. 12, 1958 |
| 2,847,299 | Keller et al. | Aug. 12, 1958 |
| 2,936,232 | Vaughan | May 10, 1960 |

OTHER REFERENCES

Badger and McCabe: Elements of Chem. Engineering, 2nd Ed., page 338, published 1936, McGraw-Hill Book Co., Inc., N.Y.

Perry: Chemical Engineer's Handbook, 3rd Ed., page 600, published 1950. McGraw Hill Book Co., Inc., N.Y.